US012145304B2

United States Patent
Forsthoevel et al.

(10) Patent No.: US 12,145,304 B2
(45) Date of Patent: Nov. 19, 2024

(54) APPARATUS AND METHOD FOR HEATING PLASTIC PREFORMS WITH SPATIALLY RESOLVED TEMPERATURE DETECTION

(71) Applicant: KRONES AG, Neutraubling (DE)

(72) Inventors: Jochen Forsthoevel, Regensburg (DE); Philipp Olenberg, Regensburg (DE); Ulrich Lappe, Neutraubling (DE)

(73) Assignee: KRONES AG (DE)

( * ) Notice: Subject to any disclaimer, the term of this patent is extended or adjusted under 35 U.S.C. 154(b) by 0 days.

(21) Appl. No.: 17/468,213

(22) Filed: Sep. 7, 2021

(65) Prior Publication Data
US 2022/0072758 A1   Mar. 10, 2022

(30) Foreign Application Priority Data
Sep. 4, 2020  (DE) .................... 10 2020 123 163.6

(51) Int. Cl.
| | | |
|---|---|---|
| *B29C 49/68* | (2006.01) | |
| *B29C 49/42* | (2006.01) | |
| *B29C 49/78* | (2006.01) | |
| *B29L 31/00* | (2006.01) | |

(52) U.S. Cl.
CPC .......... *B29C 49/68* (2013.01); *B29C 49/4205* (2013.01); *B29C 49/786* (2013.01); *B29C 49/78* (2013.01); *B29L 2031/7158* (2013.01)

(58) Field of Classification Search
CPC .......... B29C 49/68; B29C 49/42; B29C 49/78
See application file for complete search history.

(56) References Cited

U.S. PATENT DOCUMENTS

| | | | |
|---|---|---|---|
| 8,163,225 B2 | 4/2012 | Forsthovel et al. | .... B29C 13/08 |
| 8,591,779 B2 * | 11/2013 | Senn | .................... B29C 49/4205 |
| | | | 425/522 |
| 9,096,393 B2 | 8/2015 | Stein et al. | |
| 9,403,311 B2 * | 8/2016 | Forsthoevel | ............ B29C 49/06 |

(Continued)

FOREIGN PATENT DOCUMENTS

| | | | |
|---|---|---|---|
| CN | 102205625 A | 10/2011 | |
| CN | 102837420 | 12/2012 | ............. B29C 49/64 |

(Continued)

OTHER PUBLICATIONS

Search Report issued in German Patent Appln. No. 10 2020 123 163.6, dated May 12, 2021, with English translation, 12 pages.

(Continued)

*Primary Examiner* — Gregory A Wilson
(74) *Attorney, Agent, or Firm* — HAYES SOLOWAY P.C.

(57) ABSTRACT

An apparatus for producing plastic containers with a heating device configured to heat plastic preforms and with a forming device which forms the heated plastic preforms into plastic containers, wherein this forming device being arranged downstream of the heating device in the transport direction of the plastic preforms, and wherein the heating device and/or the forming device having at least one regulating device which makes it possible to regulate the heating process and/or the forming process as a function of at least one property of the plastic preforms. According to the invention, the at least one control device for controlling takes into account in advance at least one variable value which influences the heating process and/or the forming process.

13 Claims, 1 Drawing Sheet

(56) References Cited

U.S. PATENT DOCUMENTS

| | | | |
|---|---|---|---|
| 9,610,725 B2 | 4/2017 | Gendre et al. | B29C 49/78 |
| 9,676,136 B2 | 6/2017 | Deau | B29C 49/78 |
| 10,960,595 B2 | 3/2021 | Zoelfl et al. | B29C 49/42 |
| 11,440,236 B2 | 9/2022 | Finger et al. | B29C 49/42 |
| 11,534,955 B2 | 12/2022 | Blochmann et al. | B29C 49/78 |
| 11,648,725 B2 | 5/2023 | Finger et al. | B29C 49/64 |
| 2002/0011681 A1 | 1/2002 | Rose et al. | |
| 2003/0171889 A1* | 9/2003 | Shelby | B29C 49/6454 |
| | | | 702/130 |
| 2005/0146065 A1 | 7/2005 | Cochran et al. | |
| 2006/0118983 A1 | 6/2006 | Cochran et al. | |
| 2008/0038500 A1 | 2/2008 | Page et al. | B29C 35/08 |
| 2008/0211125 A1 | 9/2008 | Derrien et al. | B29C 49/78 |
| 2009/0108505 A1 | 4/2009 | Steiner | |
| 2009/0261513 A1 | 10/2009 | Forsthovel et al. | |
| 2011/0236517 A1 | 9/2011 | Senn et al. | B29C 49/78 |
| 2011/0260350 A1 | 10/2011 | Haesendonckx et al. | |
| 2011/0294085 A1 | 12/2011 | Voth et al. | 432/31 |
| 2012/0007289 A1 | 1/2012 | O'Connell | B29C 49/78 |
| 2012/0085071 A1 | 4/2012 | Hahn et al. | |
| 2012/0226376 A1 | 9/2012 | Hacesendonckx et al. | |
| 2012/0321741 A1* | 12/2012 | Voth | F16C 33/56 |
| | | | 425/533 |
| 2012/0326345 A1 | 12/2012 | Gendre et al. | |
| 2013/0011807 A1 | 1/2013 | Winzinger et al. | B29C 49/68 |
| 2013/0056913 A1* | 3/2013 | Forsthoevel | B29C 49/4205 |
| | | | 425/526 |
| 2013/0221579 A1 | 8/2013 | Bellec et al. | |
| 2014/0145375 A1 | 5/2014 | Feuilloley | B29C 35/0288 |
| 2015/0321412 A1 | 11/2015 | Deau | B29C 49/06 |
| 2015/0321413 A1* | 11/2015 | Deau | B29C 49/78 |
| | | | 700/110 |
| 2016/0151957 A1 | 6/2016 | Wolfe et al. | |
| 2016/0325485 A1 | 11/2016 | Gendre et al. | |
| 2018/0178431 A1 | 6/2018 | Delaunay et al. | B29C 45/80 |
| 2018/0178438 A1* | 6/2018 | Delaunay | B29C 49/786 |
| 2019/0031383 A1 | 1/2019 | Feilloley et al. | B65B 61/02 |
| 2020/0298463 A1 | 9/2020 | Stopfer et al. | |
| 2021/0060846 A1 | 3/2021 | Uluturk et al. | B29C 49/6418 |
| 2021/0078235 A1 | 3/2021 | Kitzinger et al. | |
| 2021/0101315 A1 | 4/2021 | Obermeier et al. | B29B 13/02 |
| 2021/0187815 A1 | 6/2021 | Zimmering | |
| 2021/0325263 A1 | 10/2021 | Bourvellec et al. | |
| 2021/0403304 A1 | 12/2021 | Hayakawa | B67C 7/0046 |
| 2022/0024109 A1 | 1/2022 | Kuwano | |
| 2022/0072758 A1 | 3/2022 | Forsthoevel et al. | B29C 49/68 |

FOREIGN PATENT DOCUMENTS

| | | | |
|---|---|---|---|
| CN | 103442864 | 12/2013 | B29C 13/02 |
| CN | 104428122 | 3/2015 | B29C 49/78 |
| CN | 104470700 | 3/2015 | B29C 49/78 |
| CN | 108237678 | 7/2018 | B29C 49/78 |
| CN | 108778678 | 11/2018 | B29C 49/64 |
| CN | 109203431 | 1/2019 | B29C 49/64 |
| CN | 111132812 | 5/2020 | B29C 49/78 |
| DE | 19843053 | 3/2000 | |
| DE | 603 05 993 | 10/2006 | B29C 49/64 |
| DE | 102005060814 | 7/2007 | |
| DE | 102008057999 | 5/2010 | |
| DE | 102009026259 | 2/2011 | B29C 49/68 |
| DE | 10 2010 003 350 | 9/2011 | B29C 49/06 |
| DE | 10 2010 021 445 | 12/2011 | B29D 49/68 |
| DE | 102015122106 | 6/2017 | B29C 49/64 |
| DE | 102016103117 | 8/2017 | B65B 57/00 |
| DE | 102017120201 | 3/2019 | B29C 49/80 |
| DE | 102017120634 | 3/2019 | |
| DE | 102017120862 | 3/2019 | B29C 49/64 |
| DE | 102017010970 | 5/2019 | |
| DE | 102017126240 | 5/2019 | B29C 49/78 |
| EP | 0856392 A2 * | 8/1998 | |
| EP | 1342550 | 9/2003 | B29C 49/64 |
| EP | 2110224 | 10/2009 | B29C 49/64 |
| EP | 2236268 | 10/2010 | B29C 49/42 |
| EP | 2439048 | 4/2012 | |
| EP | 2537664 | 12/2012 | B29C 49/78 |
| EP | 1851517 | 11/2016 | G01F 19/00 |
| EP | 2098356 | 1/2017 | B29C 49/78 |
| EP | 3181328 | 6/2017 | |
| EP | 3804958 | 4/2021 | B29C 49/78 |
| EP | 3964349 | 6/2023 | B29C 49/64 |
| FR | 3074714 | 12/2017 | B29C 49/78 |
| WO | WO 2005067591 | 7/2005 | |
| WO | WO 2009053418 | 4/2009 | |
| WO | WO 2011023155 | 3/2011 | |
| WO | WO 2011066886 | 6/2011 | B29C 49/38 |
| WO | WO 2012038652 | 3/2012 | |
| WO | WO 2015121558 | 8/2015 | |
| WO | WO 2016012704 | 1/2016 | B29C 49/78 |
| WO | WO 2017144145 | 8/2017 | G05B 15/02 |
| WO | WO 2019038441 | 2/2019 | B29C 49/78 |
| WO | WO 2019048419 | 3/2019 | B29C 49/64 |
| WO | WO 2019048598 | 3/2019 | |
| WO | WO 2019048628 | 3/2019 | |
| WO | WO 2019092078 | 5/2019 | B29C 49/78 |
| WO | WO 2020043974 | 3/2020 | |
| WO | WO 2020116358 | 6/2020 | |

OTHER PUBLICATIONS

Search Report issued in German Patent Appln. No. 10 2020 123 166.0, dated May 14, 2021, with English translation, 12 pages.

Search Report issued in European Patent Appln. No. 21192794.2, dated Jan. 10, 2022, with English translation, 10 pages.

Search Report issued in European Patent Appln. No. 21192920.3, dated Jan. 19, 2022, with English translation, 8 pages.

Official Action issued in related U.S. Appl. No. 17/468,247, dated Jan. 30, 2024, 2023, 22 pages.

Extended European Search Report issued in EP 23166010.1-1014, dated Jul. 5, 2023, with machine English translation, 7 pages.

Chinese Office Action issued in CN Appln. No. 202111023502.2, dated Jan. 30, 2024, with machine English translation, 23 pgs.

Notice of Opposition filed in EP 21 192 920.3 (English translation), dated Mar. 12, 2024, 37 pgs.

Notice of Opposition filed in EP 21 192 920.3, machine translation, dated Mar. 12, 2024, 61 pgs.

U.S. Appl. No. 17/468,247, filed Sep. 7, 2021, Lappe et al.

Notice of Opposition filed in EP 21192794.2, with machine translation, dated Apr. 18, 2024, 82 pgs,.

Notice of Opposition filed in EP 21192794.2, (English translation), dated Apr. 29, 2024, 34 pgs.

Thielen et al., "Blasformen von Kunststoff-Hohlkörpern", (English text of foreword), 2006, 52 pgs.

Action issued in U.S. Appl. No. 17/468,247, dated Aug. 7, 2024, 20 pgs.

Office Action issued Chinese application No. 202111023502.2, English translation, dated Jul. 25, 2024, 24 pgs.

* cited by examiner

APPARATUS AND METHOD FOR HEATING PLASTIC PREFORMS WITH SPATIALLY RESOLVED TEMPERATURE DETECTION

BACKGROUND OF THE INVENTION

The present invention is therefore based on the object of reducing the reject rate, which can arise in particular from recycled material.

SUMMARY OF THE INVENTION

The present invention relates to an apparatus and a method for heating plastic preforms. Such apparatus and methods have been known in the prior art for a long time. Usually, plastic preforms are first heated in a multi-stage process and these are then formed into plastic containers using a forming device, such as a stretch blow-moulding machine. Recently, there has been an increasing trend to use recycled material for the plastic preforms. In particular, the material PET is used. However, this material leads to problems which are described below.

First of all, recycled material can more frequently lead to impurities in the material and in individual plastic preforms and thus also to increased reject rates, as these impurities represent a local disturbance in the material structure and, above a certain size, ultimately also lead to damage such as bottle bursts in the blowing process and thus to disturbances and also an increased reject rate.

In addition, variations in the material or in the material properties, in particular in the heat absorption of plastic preforms, due to different infrared absorption behaviour of plastic preforms, which are heated in particular next to each other in infrared ovens, can lead to a strongly deviating heating behaviour and thus to strongly deviating final temperatures when leaving the heating section. This can also lead to very different behaviour in the subsequent stretch blow moulding process and ultimately to very different container qualities. This can lead to the unusability of the manufactured container (if a container can still be blown at all) or even to the bursting of the container already during the manufacturing process and thus to an increased reject rate.

The present invention is therefore based on the object of reducing the reject rate, which can arise in particular from recycled material. This is achieved according to the invention by the subject matters of the independent patent claims. Advantageous embodiments and further developments are the subject matter of the subclaims.

An apparatus according to the invention for heating plastic preforms comprises a transport device which transports the plastic preforms along a predetermined transport path. In addition, the apparatus has at least one heating device which is arranged along the transport path of the plastic preforms in order to heat the plastic preforms during their transport.

According to the invention, the device has a temperature detection device which is suitable and intended for detecting a temperature of the plastic preforms in a spatially resolved manner.

Particularly preferably, the heating device is an infrared oven, i.e. the heating of the plastic preforms is carried out with infrared radiation. However, the use of a microwave oven would also be conceivable. In a preferred embodiment, the transport device has a circumferential transport means. Advantageously, a plurality of holding devices are arranged on this circumferential transport means, which can be, for example, a transport wheel, but also a transport chain or a transport belt, which serve to hold the plastic preforms (in particular individually).

Preferably, the transport device transports the plastic preforms along a transport path that has both straight sections and curved sections. In particular, the temperature detection device is located in a section where the plastic preforms are transported along a curved transport path section. Thus, the transport device can convey the plastic preforms along two straight-line sections which are connected to each other by a curved segment or section.

It is therefore proposed that the plastic preforms are observed in the heating device or oven, in particular in order to obtain information about them which can lead to measures described in more detail below, such as ejection of the plastic preform in question (also called preform) or intervention in the subsequent blow-moulding machine, in order to avoid in any case bursting of containers during the blowing process.

In addition, subsequent problems should also be prevented, such as running up or filling too quickly and thus machine stops, or containers being filled with holes and thus contamination of the containers, etc. The invention therefore proposes that the plastic preforms are inspected in a spatially resolved manner, i.e. not only the temperature of the entire plastic preform is recorded, but this is inspected in a spatially resolved manner so that the temperature can be assigned to specific surface areas of the plastic preform.

In a preferred embodiment, the temperature detection device comprises at least one infrared imaging recording device which captures a spatially resolved image of the plastic preforms. It is therefore proposed to film the plastic preforms at a certain position, in particular, as described in more detail below, in the deflection of the infrared oven, i.e. to a certain extent halfway, with an infrared image recording device or an infrared camera. This has the advantage that at least a complete handling of the surface of each passing plastic preform can be captured and subsequently analysed.

In particular, strongly different heated areas of the plastic preform can be analysed. In a further preferred embodiment, the temperature detection device is arranged in a stationary position. This means that the plastic preforms are preferably transported past the temperature detection device. Preferably, spatially resolved images of the plastic preforms can be recorded during this transport.

In a further preferred embodiment, the temperature detection device is arranged along a transport path of the plastic preforms downstream of a first set of heating devices and upstream of a second set of heating devices.

As mentioned above, the heating devices are preferably arranged stationary and the plastic preforms are transported past them by the transport device. Preferably, the heating devices are arranged along a straight transport section of the plastic preforms and between these straight transport sections there is a curved transport section and in particular a section in which the transport direction of the plastic preforms is deflected or reversed. The temperature detection device is particularly preferably located in this deflection area.

Preferably, the transport device thus forms a deflection area in which the transport direction of the plastic preforms is reversed. The temperature detection device is preferably arranged in this deflection area. With this design, as mentioned above, the inspection of the plastic preforms is, to an extent, carried out halfway.

However, it would also be possible to arrange the image recording device or the temperature detection device at the end of the heating device, i.e. after the second heating devices. The arrangement in the deflection area offers the advantage of retrofitting. This arrangement in the deflection area also offers the advantage that no further units, such as the temperature detection devices, have to be installed downstream of the oven, so that the distance for transporting the plastic preforms to a forming device can also be kept short.

In a further preferred embodiment, the temperature detection device is suitable and intended to detect the temperature of the plastic preforms along substantially their entire circumferential surface and/or length.

Several approaches are conceivable for this purpose. For example, it would be possible for the temperature detection device to have two image recording devices which are arranged at the two opposite times of the transport path of the plastic preforms and observe the plastic preforms from both sides. Furthermore, it would be possible that an image recording device is provided which records several images of the plastic preforms transported past. In a preferred embodiment, the apparatus has a rotating device which transports the plastic preforms at least in sections along the transport path about their own longitudinal direction. This rotating device can thereby cause uniform heating in the plastic preforms during heating.

In a further preferred embodiment, the apparatus is suitable and intended to also detect a total temperature and/or total heat of the plastic preforms.

In a further preferred embodiment, the apparatus is suitable for identifying and/or marking certain plastic preforms in response to a detected temperature (a spatially resolved temperature or also a total temperature). In this context, identification and/or marking is understood to mean in particular identification for subsequent processing, such as a subsequent forming process; i.e. the machine assigns a future treatment unit, such as a forming station, in particular to this certain plastic preform.

For example, it can be determined that a total heat of certain plastic preforms deviates from a target temperature. This deviation can be stored, for example in a shift register. Further information can also be stored, such as the amount of the deviation compared to a reference, such as the recipe that is currently being run.

This information can be passed on to a control or regulating device so that it can, for example, change certain parameters, such as a stretching speed, a pre-blowing duration or a pre-blowing time for certain plastic preforms. In particular, this can be done station-specifically for certain forming stations. In other words, a control and/or regulation device can preferably adapt a forming process for these plastic preforms.

Preferably, however, a rotating device is also provided which also rotates the plastic preforms during transport in the area in which the image recording device or the temperature detection device is arranged. In this way, several images can be taken of the same plastic preform.

Furthermore, an illumination device is preferably provided which illuminates the plastic preforms at least during the recording of images. This illumination device is thus preferably arranged in a region of the inspection device or forms a component of the inspection device. This illumination device can be designed as a flash lamp or have such a lamp.

In a further preferred embodiment, the apparatus or the temperature detection device has an evaluation device which evaluates the images recorded by an image recording device and determines local temperature fluctuations of the plastic preforms.

In a preferred embodiment, the temperature detection device is suitable and intended to detect local heating deviations of a plastic preform and preferably this plastic preform can be marked as defective or contaminated. In this embodiment, it is proposed that the evaluation device detects such heating deviations and, in response to such a deviation, the corresponding plastic preform is marked accordingly (for example in a shift register). In response, this plastic preform can be ejected, for example at an inlet of a blowing wheel. This ejection can take place in particular before the start of the blowing process.

It is possible that this evaluation device first combines several images in order to obtain a complete processing of the images of the respective plastic preforms. Within these images, it is possible, for example, to search for local temperature fluctuations, such as areas that have been heated more or less.

It is possible to evaluate the image in the area of pixels or in the area of groups of pixels in order to obtain a spatially resolved temperature profile of the plastic preforms.

Preferably, the evaluation device uses artificial intelligence (AI) to evaluate the images taken from the plastic preforms.

It is possible, for example, that an image processing software is provided which detects local heating deviations. A plastic preform detected in this way can then be marked as defective and, for example, marked as contaminated in a storage device such as a shift register. It is therefore possible for a plastic preform so marked to be rejected at a further position, for example at an inlet to a forming device, before being introduced into the blow moulding process. Alternatively, it is also possible to prevent such a plastic preform from being blown into a container in another way, for example by switching off the relevant blow station for the blow moulding process.

Furthermore, it would also be possible that not only the fact that a temperature deviation exists is detected, but also its location is localised. For example, a subsequent blow moulding process could be adapted to this respective error and the corresponding plastic preform could be blown with different blowing parameters. In this case, it is possible that in case of a deviation of the total heat, the plastic preform is also marked, for example with a shift register, but together with information about the amount of deviation compared to a reference or an (ideal) plastic preform. However, this reference could also be the recipe that is currently being run or that is to be blown later. In this way, as described in more detail below, the temperature profile of the plastic preforms can be used to make a prediction about the container to be produced in the future.

Preferably, the plastic preforms used are made of PET.

It is possible that this information is transferred to the control device or regulation device or to a blowing control so that the stretch blowing parameters can be intervened in a station-specific manner, in particular a stretching speed with which the stretching bar stretches plastic preforms, a pre-blowing duration or a pre-blowing time.

In this way, the information from the temperature detection devices can be used to still blow (for example, by means of an algorithm) a bottle that at least reasonably corresponds to the material distribution of a reference process.

In addition, it would also be possible to check the result of the temperature detection device by means of suitable inline inspection techniques downstream of the blowing process, such as a wall thickness measurement or a bottom inspection. These additional measurement techniques could be fed back and used to optimise the parameters of this algorithm in a further preferred embodiment of the invention. In this way, the algorithms described herein or the control device could be set up in a self-learning manner.

It would therefore be possible to compare the result of the temperature detection with a result of a subsequent inspection, such as a container wall thickness inspection or a bottom inspection. Based on this comparison, further process parameters such as, in particular, blowing parameters can be adjusted in order to obtain self-improving recipes for the apparatus according to the invention in this way.

In a preferred embodiment, however, the parameters of this algorithm are permanently stored in the control system in a basic embodiment, wherein this can take place recipe-dependent or recipe-independent.

The influencing parameters for this software or algorithm are selected from a group of parameters which include the geometry of the plastic preform, the geometry of the manufactured container, the infrared absorption of the plastic preform, one or more parameters for the stretch blow moulding process (which can also be a throttle information about the blow moulding process) for which the basic recipe was created.

In a further preferred embodiment, the apparatus has a further inspection device, which is arranged in particular downstream of a forming device for forming plastic preforms into plastic containers. This further inspection device can check the result of the forming.

Thus, the result of a forming process can be checked by suitable inspection techniques downstream of the blowing process and in particular in-line inspection techniques (e.g. wall thickness measurement, bottom inspection). These additional measurement techniques could be fed back and used for parameter optimisation of the algorithm in a further embodiment of the idea. In this way, a self-learning parameter optimisation can be performed.

The present invention is further directed to an arrangement for manufacturing plastic containers, comprising an apparatus of the type described above and a forming device arranged downstream of said apparatus in the transport direction of the plastic preforms for forming plastic preforms into plastic containers, wherein said forming device comprising a plurality of forming stations for forming the plastic preforms into plastic containers, and the arrangement comprising an assigning device which assigns to each plastic preform inspected by the temperature detection device a specific forming station in which said plastic preform is formed.

In this way, an individual adaptation of a forming process is individually adaptable for each plastic preform and in particular adaptable to the result of an inspection of this plastic preform.

In a further preferred embodiment, the arrangement comprises a control device and/or regulating device which controls and, in particular, regulates the forming process in response to a result of the temperature detection and/or a signal received from the temperature detection device. For example, parameters of the blowing process, such as blowing pressures or blowing durations, can be adjusted and/or changed.

Preferably, the arrangement has an ejection device which is suitable and intended for ejecting plastic preforms from the transport path. In particular, this ejection device is arranged downstream of the heating device. In a further preferred embodiment, the ejection device is arranged upstream of the forming device.

The present invention is further directed to a method for heating plastic preforms, wherein the plastic preforms are transported along a predetermined transport path by a transport device and are heated during their transport by at least one heating device arranged along the transport path of the plastic preforms.

According to the invention, a temperature detection device detects the temperature of the plastic preforms in a spatially resolved manner. Preferably, the temperature of the plastic preforms is recorded during their transport, i.e. during their transport movement.

Advantageously, at least one value is output on the basis of this temperature detection, which is used to control or regulate the heating device and/or a downstream forming device.

The present invention is further directed to an apparatus for producing plastic containers, which has a heating device which heats plastic preforms, wherein this heating device having a transport device which transports the plastic preforms individually along a predetermined transport path during their heating, and at least one heating device which heats the plastic preforms during their transport along the transport path, wherein the heating device preferably further having a first control device and, in particular, a first regulating device for controlling and/or regulating the heating process.

Furthermore, the apparatus comprises a forming device which forms the heated plastic preforms into plastic containers, wherein said forming device comprises a plurality of forming stations for forming the plastic preforms into plastic containers, wherein said forming device is arranged downstream of the heating device in the transport direction of the plastic preforms, and wherein the heating device and/or the forming device has at least one control device which enables the heating process and/or the forming process to be controlled as a function of at least one property of the plastic preforms.

In this case, the forming device can have a second control device and, in particular, a second regulating device which controls a regulation of the forming process as a function of at least one property of the plastic preforms.

Furthermore, the apparatus preferably comprises at least one temperature detection device which is arranged in a region of the heating device or between the heating device and the forming device and which is suitable and intended for detecting a temperature of the plastic preforms.

According to the invention, at least one of the control devices and/or regulating devices for regulating takes into account in advance at least one variable which influences the heating process and/or the forming process.

Advantageously, the property of the plastic preform is selected from a group of properties including a water content, IR characteristic and temperature of the plastic preform.

This property can also be a characteristic property that characterises this plastic, which is predetermined by its material, for example.

It is noted that the advantageous embodiments and further embodiments described with reference to the present invention may also apply to the invention described above. Similarly, the advantageous embodiments and further embodiments described above with reference to the above invention may apply to the invention referred to herein. Also, in a particularly preferred embodiment, the two inventions may be combined, which may be particularly advantageous in controlling the forming device.

In the current state of the art, the control of the forming device in particular, such as a blow moulding machine, is a relatively less complex procedure. For example, it is known that the temperature of the plastic preforms is measured at the outlet of the heating device and thus the heating device itself is (re-)controlled.

However, disturbance variables and changes in, for example, the properties of the plastic preforms or ambient conditions are only detected via a change in the temperature of the plastic preforms and in turn used for control. In this way, control can be performed retrospectively, for example, after deviations of the temperatures of the plastic preforms from a target temperature have been detected.

In addition, it is also known that the user manually intervenes in the heating device or also in the blow moulding machine in order to change the respective forming process. Accordingly, systems are also known which, for example, control the process by measuring the wall thicknesses of the already blown containers. Thus, for example, a changing input temperature of the plastic preforms is only used to control the machine when this has already had an effect on the output temperature and thus also on the container properties. In the procedure proposed here, the invention as also the above object is therefore based on enabling control at an earlier point in time.

It is therefore proposed that the control takes the variable into account in advance, i.e. by "in advance" it is understood that this variable is taken into account before it has a measurable effect, for example by heating the temperature of the plastic preform. In particular, the machine can predict how certain variable values or also their changes will affect the manufacturing process and in particular the heating process and/or the forming process or also the finished container.

Preferably, these variable values are selected from a group of values including a humidity, an ambient pressure, an ambient temperature, properties of the plastic preforms and the like.

In the context of the present invention, it is therefore proposed that a temperature distribution after the heating process will be under the respective given conditions or how certain initial conditions or variable values will affect the temperature distribution.

In addition, other properties such as a wall thickness distribution can also be predicted (in particular from the variable values mentioned above).

Within the scope of the present invention, it is therefore proposed to directly use a change in the properties of the plastic preform and/or other influencing variables (which will be mentioned in more detail below) for the control of the heating process and/or the forming process or blowing process for the entire machine or for the heating and/or blowing process of an individual plastic preform, without first waiting for the result of the process due to the changing properties of the controlled variable.

For example, a changing property of the plastic preform, such as a different material, can already be taken into account in the control of the heating device and/or the forming device before it manifests itself in the actual heating process. Preferably, both control devices, i.e. the control device of the heating device and also the control device of the blow moulding device, take said variable values into account—in particular in advance. It is possible that these control devices are assigned separately to the heating device and the forming device. However, it is also conceivable that a complete or common control device is provided, which controls both the heating device and also the forming device.

In a further preferred embodiment, the heating device has a plurality of heating elements. Preferably, these heating elements are arranged stationary with respect to the transport path of the plastic preforms. Preferably, these multiple heating elements are controlled and/or regulated independently of each other.

It is therefore further proposed that a certain value, such as an environmental parameter, such as an ambient temperature or also a property of the plastic preform, in particular on the basis of empirical values, is taken into account in advance and, for example, a corresponding modification is made before or while the plastic preform enters the heating device, in order to achieve an ideal result of the subsequent forming process.

It is therefore proposed that the control and/or the above-mentioned control devices of the machine can make predictions in any and in particular a predetermined manner about the effect of the change in the input value. Thus, as mentioned above, this variable value is preferably an input value for a process and/or a procedure which subsequently controls the heating device and/or the forming device. These predictions are preferably made to compensate for a change in the input value without it resulting in a large change in the container properties.

An example of such an input value is also the spatially resolved detection of the temperature of the plastic preforms described above. Based on this spatially resolved temperature, the control device of the heating device and/or the control device for the forming device can be readjusted in order to achieve a satisfactory quality of the plastic containers produced.

Preferably, the control device also takes into account values that are output by the temperature detection device. In this way, the heating device and/or the forming device can also be readjusted on the basis of these values.

In a preferred embodiment, the forming device has a movable and, in particular, rotatable carrier. Preferably, forming stations are arranged on this carrier, wherein these forming stations preferably each have blow moulds within which the plastic preforms can be formed into the plastic containers.

Furthermore, these forming stations preferably also have rod-like bodies, in particular so-called stretching rods, which can be inserted into the interior of the plastic preforms in order to stretch them in their longitudinal direction.

In a further preferred embodiment, these forming stations each have pressurisation devices which acting upon the plastic preforms with a flowable medium, in particular with a gaseous or even liquid medium.

Preferably, the control device acts on one and preferably several control values. These control variables are selected from a group of values which includes one or more pressures with which the plastic preforms are acted upon, a speed of the stretching bar, the amount of a pre-blowing pressure, the amount of an intermediate blowing pressure, the amount of a final blowing pressure, a sequence of the application of the pressures and the like.

The first control device which controls the heating device can also preferably change and/or control at least one and preferably at least a plurality of control values. These values are selected from a group of values which includes a heating power, in particular a heating power of the individual heating devices, a heating power of the heating devices as a function of a height of the plastic preform and the like. Preferably, these heating devices have a plurality of radiant heaters, which are particularly preferably arranged one above the other in the direction of the plastic preforms to be heated. It is possible that these individual radiant heaters are controlled separately, and thus preferably different areas in the longitudinal direction of the plastic preform are heated differently.

Another value to be controlled can be, for example, a rotational speed of the plastic preforms around their own axis. Particularly preferably, the heating device has a rotating device which rotates the individual plastic preforms with respect to their longitudinal directions. It is possible that each individual plastic preform is rotated separately. However, it would also be possible for the plastic preforms to be rotated uniformly. In this way, it is particularly preferable that the rotation speed of these plastic preforms can be adjusted with respect to their longitudinal directions.

Particularly preferably, the apparatus comprises a processor device which, on the basis of the variable value and/or on the basis of the change in the variable value, determines a determining value which can be used by at least one of the control devices, and preferably by both control devices, for control and/or which effects a corresponding control. It is possible, for example, for the processor device to determine from a value which indicates a changing ambient temperature of the machine how the controlling of the heating device and/or the forming device are to be adjusted. In this case, the heating device and/or the forming device are controlled accordingly.

Thus, the variable value is preferably understood to be the changing input value, such as a changed material of the plastic preform or a changed ambient temperature. From this variable value, the processor device determines a determination value which states or is a measure of how this variable value will have an effect, for example how a changed ambient temperature will have an effect on the temperature of the plastic preforms at the outlet of the heating device. The control device then adjusts a control value, such as the heating power of the heating devices and/or a blowing pressure of the forming device, on the basis of this determining value, so that these heating powers and/or the blowing pressure are the control values accordingly.

Preferably, the processor device is suitable and intended for determining and/or predicting, on the basis of the variable value and/or a change in the variable value, its effect on the heating process and/or the forming process. On the basis of this, the effect on the control and/or the regulation is influenced.

In a preferred embodiment, the apparatus and/or the processor device determines the determination value and/or control value on the basis of a model. Thus, the control and/or regulation system preferably has implemented a model which determines the relationship between the influencing values and the results or the container properties and/or the determination values. This model can be permanently stored in a machine control system. However, it can also be parameterisable by the operator or by the apparatus itself and/or a measurement of the properties of the containers.

In a preferred embodiment, the apparatus therefore also has an inspection device that inspects the manufactured containers or the blown containers. These can be inspected, for example, with regard to the wall thickness of their walls. In addition, local differences in wall thickness can also be determined. The results of this inspection are also preferably taken into account in the control of the heating device and/or the forming device.

Preferably, the apparatus has a memory device in which both determination values and deviations of the input values as well as values resulting from the inspection of the manufactured containers and/or the heated plastic preforms are recorded. In this way, a large number of value tuples can be determined.

For example, it can be determined and stored which wall thickness and which temperature of a heated plastic preform result when certain environmental parameters, such as an ambient temperature, are present and a certain material of the plastic preform is used. Furthermore, a plurality of such values can be entered into this memory device.

In this way, it is possible that the machine learns itself, to an extent, and stores a plurality of such assignments in a memory device. If an environmental property such as an ambient temperature changes in a future operation, this change can be taken into account and adjusted accordingly on the basis of the stored experience values so that the container quality remains the same.

It is therefore proposed in particular that within the scope of the control of the forming device and/or the heating device not only the results are taken into account as control values as usual, but also changing input values. Thus, for example, a plurality of ambient temperatures can be stored for a particular material of a plastic preform and, for example, also a plurality of thicknesses of the walls of the plastic preforms. For example, a certain material can be assigned an expected value in a database or a look-up table or by means of a regression model for a certain temperature and a certain wall thickness as to how this plastic preform is heated. This expected value can be communicated to the control of the blow moulding machine and also to the heating device and this can control or modify the process accordingly (in a corresponding manner as in the case of a measured result).

In a preferred embodiment, the value influencing the heating process and/or the forming process is selected from a group of values which includes physical properties of a plastic preform to be treated, such as, in particular, its material, its size, a wall thickness or the like, ambient conditions, such as, in particular, an ambient temperature, an ambient pressure or an ambient humidity and the like, machine states of the devices and the like.

In a further preferred embodiment, at least the second control device enables individual control for the treatment of each plastic preform. It should be taken into account here that, as mentioned above, the forming device has a plurality of forming stations, each of which is used to create a container. However, this also means that the blowing process of each individual plastic preform can be controlled individually.

In a preferred embodiment, the device has an assignment device that assigns each plastic preform fed to the heating device to a specific forming station that forms this plastic preform. In this way, the process can be individually adapted to the individual plastic preforms.

It should be noted that the embodiment described above, in which the temperature of the plastic preforms is locally recorded in a spatially resolved manner, represents a possible embodiment of the invention described here. The values of this inspection can namely, before they are finally realised, already be fed to the control of the heating device or also to the subsequent blow moulding machine.

In a further preferred embodiment, the apparatus has at least one detection device for detecting the variable value. For example, an inspection device can be provided at or during the heating device, which detects, for example, a wall thickness of the plastic preform or also its material. This value can be used in advance as a variable input value for the control.

In a further preferred embodiment, the apparatus has a detection device which is suitable and intended for detecting an absorption behaviour of the plastic preforms. This detection device can be arranged in an inlet area in which the plastic preforms enter the heating device or also along a heating section. Several such detection devices can also be provided.

In a further advantageous embodiment, the apparatus has an adjustment device and/or an additional temperature control device and, in particular, an additional heating device in order to change and, in particular, increase the heating of individual plastic preforms or groups of plastic preforms (in particular individually). In this way, an individual adjustment of a heating power and/or a heating time of the plastic preforms can be made. This adjustment can be made, for example, in response to a (particularly measured) absorption behaviour and/or a (particularly measured) temperature.

In this way, a heating power can be adapted to individual plastic preforms or to groups of (in particular successive) plastic preforms and in particular increased. This adaptation device can be designed in such a way that additional heating of the entire plastic preform takes place, but it would also be possible for such an adaptation to take place in specific local areas of the plastic preform.

Preferably, this adaptation device is arranged along the transport path of the plastic preforms, for example in an infeed or along the transport path.

In an advantageous embodiment, the adaptation device has at least one radiation device and in particular at least one laser. This radiation device can additionally heat individual areas of the plastic preforms locally or individual plastic preforms in their entirety. Additional heating by means of microwaves would also be possible.

However, it would also be conceivable to (individually) cool individual plastic preforms, for example by applying cooling air (or for additional heating by applying hot air).

The present invention is further directed to a method for producing plastic containers, wherein a heating device heats plastic preforms, and wherein a transport device of this heating device separates the plastic preforms during the heating, transports them along a predetermined transport path and at least one (in particular stationary) heating device heats the plastic preforms during their transport along the transport path, and wherein a forming device forms the heated plastic preforms into plastic containers, wherein this forming device having a plurality of forming stations for forming the plastic preforms into plastic containers, wherein this forming device being arranged downstream of the heating device in the transport device for the plastic preforms, wherein at least one regulating device of the heating device and/or of the forming device controlling and/or regulating the heating process and/or the forming process as a function of at least one property of the plastic preforms (10).

In this case, a control device and/or regulating device of this forming device can regulate the forming process as a function of at least one characteristic property of the plastic preforms.

Furthermore, preferably at least one temperature detection device detects a temperature of the plastic preforms in a region of the heating device or between the heating device and the forming device.

Preferably, a first control device and/or regulating device of the heating device controls and/or regulates the heating process at least temporarily.

According to the invention, at least one of the control devices for control takes into account in advance at least one variable value influencing the heating process and/or the forming process, and the control is also carried out on the basis of this value. Preferably, both control devices take the variable value into account in advance.

It is therefore also proposed on the method side that, in contrast to the previous regulations, input values of the process are also taken into account. Preferably, it is determined from this input value or the variable value how it affects the heating process and/or the forming process (in particular according to experience).

In a preferred method, the control is based on a model that predicts the effect of the variable value on the heating process and/or the forming process. For example, a changed material can result in a change in the infrared absorption, and this can be predicted, for example on the basis of previously known data or on the basis of learned experience and/or experience values.

Preferably, this model is parameterisable. It is possible that this model can be parameterised by the user or by the machine itself, for example in a self-learning manner. However, it is also possible that this model is permanently stored.

In a further advantageous method, heating of individual preforms or individual groups of preforms is adapted and in particular increased.

Preferably, this adaptation is carried out by at least one laser, in particular as a function of the absorption behaviour of the plastic preform. Preferably, this adjustment takes place during transport, i.e. in particular during the movement of the plastic preforms.

Preferably, an absorption behaviour of the plastic preforms is determined.

BRIEF DESCRIPTION OF THE DRAWINGS

Further advantages and embodiments can be seen in the attached drawing. Therein shows.

DETAILED DESCRIPTION OF THE INVENTION

Figure 1:
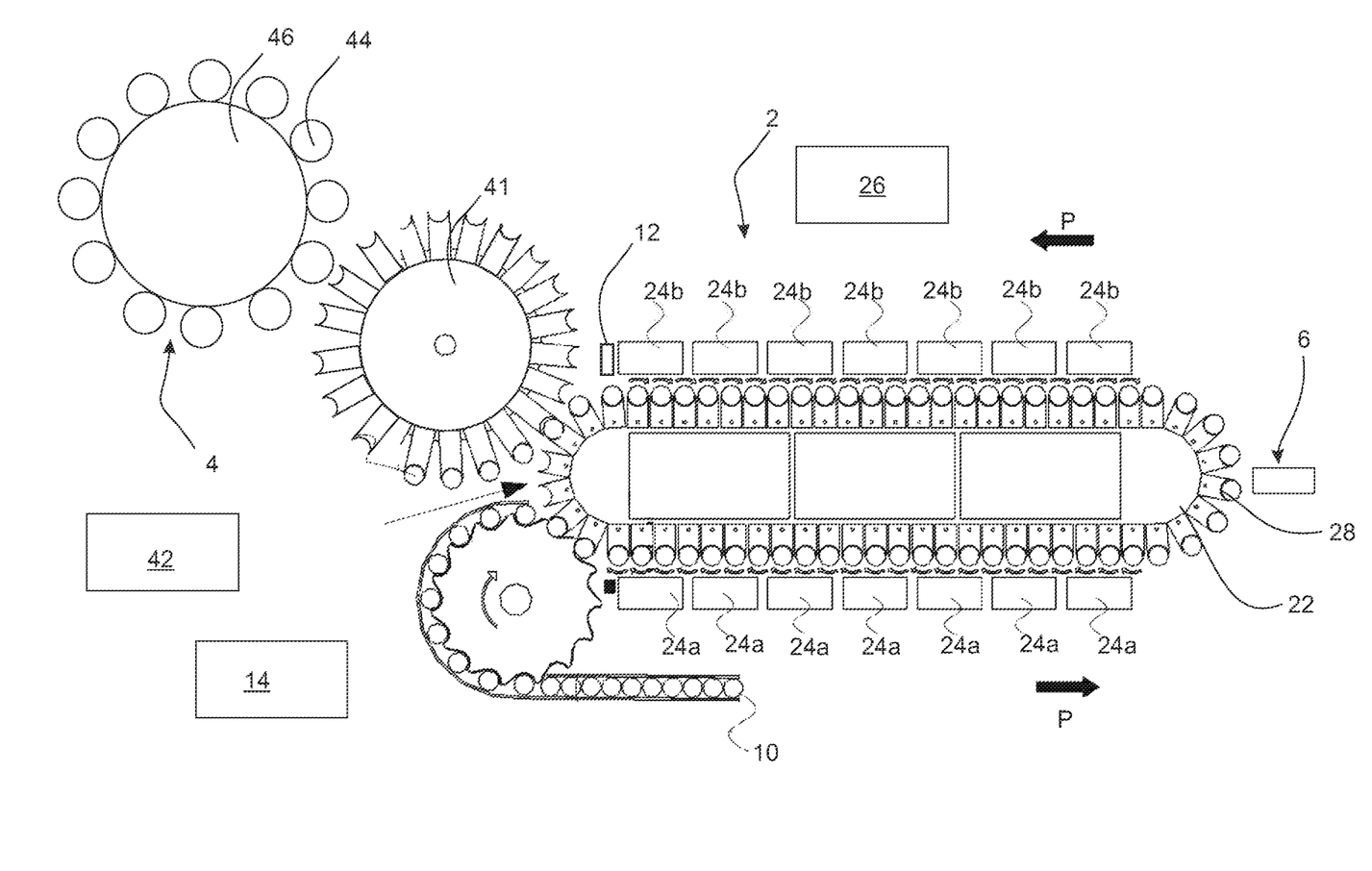
FIG. 1 a schematic representation of an apparatus according to the invention for the production of containers.

FIG. 1 shows a schematic representation of an apparatus for producing containers according to the invention. In this method, plastic preforms 10 are first separated and fed to a heating device designated in its entirety as 2. This heating device 2 has a transport device 22. This transport device is designed here as a circumferential transport chain on which a plurality of holding devices 28 are arranged, each of which holds the plastic preforms. As can be seen in FIG. 1, the plastic preforms are also rotated with respect to their longitudinal axis. A plurality of heating elements 24 a, 24 b are stationarily arranged along a transport path P. The plastic preforms 10 are guided past these and heated.

The reference sign 6 indicates an inspection device which is arranged here in the area of the deflection of the transport path P, and in particular in an area in which no heating devices are arranged. As mentioned above, this inspection device records a spatially resolved image of the plastic preform and in particular a spatially resolved image of its temperature characteristics.

The reference sign 12 indicates a further temperature detection device which detects a total temperature or an integral temperature of the heated plastic preforms. This temperature value can also be used to control and/or regulate the heating device or the downstream forming device 4.

The reference sign 26 indicates a control device for controlling the heating device 2. A transport device 41 and a forming device 4 are connected to this heating device 2. This forming device 4 has a plurality of forming stations 44 which are arranged on a carrier 46. The reference sign 42 indicates a control device for controlling this forming device.

The reference sign 14 roughly schematically indicates a processor device which, taking into account at least one input value, which is in particular the variable value mentioned above, determines a determination value which predicts a specific behaviour or a specific property of the plastic preform or of the manufactured container.

The applicant reserves the right to claim all features disclosed in the application documents as essential to the invention, provided they are individually or in combination new compared to the prior art. It is further pointed out that the individual FIGURES also describe features which may be advantageous in themselves. The skilled person immediately recognises that a certain feature described in a FIGURE can also be advantageous without adopting further features from this FIGURE. Furthermore, the skilled person recognises that advantages can also result from a combination of several features shown in individual FIGURES or in different FIGURES.

LIST OF REFERENCE SIGNS 1 apparatus
2 heating device
10 plastic preforms
12 temperature detection device
14 processor device
22 transport device
24a, 24b heating elements
26 control device of the heating device
28 holding devices
41 transport device
42 control device (of the forming device)
44 forming station
P transport path

The invention claimed is:

1. An apparatus for producing plastic containers, having a heating device configured to heat plastic preforms, wherein the heating device has a transport device configured to transport the plastic preforms individually along a predetermined transport path during heating, and at least one heating element configured to heat the plastic preforms during transport along the transport path, and a forming device configured to form the heated plastic preforms into plastic containers, wherein the forming device has a plurality of forming stations configured for forming the plastic preforms into plastic containers, wherein the forming device is arranged downstream of the heating device in the transport direction of the plastic preforms, wherein the heating device and/or the forming device has at least one control device configured to control the heating process and/or the forming process as a function of at least one property of the plastic preforms, wherein the apparatus has at least one temperature detection device arranged in a region of the heating device or between the heating device and the forming device and configured for detecting a temperature of the plastic preforms, and wherein at least one control device is configured to take into account in advance at least one variable value to influence the heating process and/or the forming process, wherein the apparatus has a processor device which, on the basis of the variable value is configured to determine a determination value which can be used by at least one of the control devices for control, and the processor device is configured to determine the determination value on the basis of a model, wherein the apparatus has an assigning device configured to assign to each plastic preform fed to the heating device a specific forming station that forms this plastic preform, so that the forming process can be individually adapted to the individual plastic preform, and wherein the apparatus is configured for identifying and/or marking certain plastic preforms in response to a detected temperature for a subsequent forming process, so that the apparatus assigns a future forming station to the certain plastic preforms, wherein this information is passed on to the control device which is configured to change a stretching speed, a pre-blowing duration or a pre-blowing time for the certain plastic preforms, wherein the change is done station-specifically for certain forming stations and the control device adapts the forming process for the certain plastic preforms.

2. The apparatus according to claim 1, wherein the processor device is configured to determine, on the basis of the variable value, its effect on the heating process and/or the forming process.

3. The apparatus according to claim 1, wherein the variable value influencing the heating process and/or the forming process is selected from a group of values consisting of physical properties of a plastic preform to be treated, ambient conditions, and machine states of the apparatus.

4. The apparatus according to claim 1, further comprising at least a second control device configured to allow individual control for the treatment of each plastic preform.

5. The apparatus according to claim 1, wherein the apparatus has at least one detection device configured for detecting the variable value.

6. The apparatus according to claim 1, wherein the apparatus has an adjustment device configured for changing and heating of individual plastic preforms or groups of plastic preforms.

7. The apparatus according to claim 6, wherein the adjustment device comprises at least one radiation device.

8. A method for producing plastic containers, wherein a heating device heats plastic preforms, wherein a transport device of the heating device transports the plastic preforms individually along a predetermined transport path during heating, and at least one heating element heats the plastic preforms during transport along the transport path, and wherein a forming device forms the heated plastic preforms into plastic containers, wherein the forming device has a plurality of forming stations for forming the plastic preforms into plastic containers, wherein the forming device is arranged downstream of the heating device in the transport direction of the plastic preforms, wherein at least one control device of the heating device and/or of the forming device controls and/or regulates the heating process and/or the forming process as a function of at least one property of the plastic preforms, and wherein at least one temperature detection device in a region of the heating device or between the heating device and the forming device detects a temperature of the plastic preforms, wherein
the at least one control device for control takes into account in advance at least one variable value configured to influence the heating process and/or the forming process, and the control is also carried out on the basis of the value, wherein
a processor device is provided which, on the basis of the variable value determines a determination value which can be used by at least one of the control devices for control, and the processor device determines the determination value on the basis of a model, wherein
an assigning device is provided configured to assign to each plastic preform fed to the heating device a specific forming station that forms this plastic preform, so that the forming process can be individually adapted to the individual plastic preform, and certain plastic preforms are identified and/or marked in response to a detected temperature for a subsequent forming process, so that a future forming station is assigned to the certain plastic preforms, wherein this information is passed on to the control device so that it changes a stretching speed, a pre-blowing duration or a pre-blowing time for the certain plastic preforms, wherein the change is done station-specifically for certain forming stations and the control device adapts the forming process for the certain plastic preforms.

9. The method according to claim 8, wherein the control is carried out on the basis of a model which, on the basis of the variable value, predicts its effect on the heating process and/or the forming process.

10. The method according to claim 9, wherein the model is parameterizable.

11. The method according to claim 10, wherein a heating of individual preforms or individual groups of preforms is adjusted.

12. The method according to claim 9, wherein a heating of individual preforms or individual groups of preforms is adjusted.

13. The method according to claim 8, wherein a heating of individual preforms or individual groups of preforms is adjusted.

* * * * *